United States Patent
Benhanokh et al.

(10) Patent No.: US 7,818,609 B2
(45) Date of Patent: Oct. 19, 2010

(54) METHODS AND SYSTEMS FOR MANAGING CORRUPTED META-DATA IN A COMPUTER SYSTEM OR NETWORK

(75) Inventors: Zvi Gabriel Benhanokh, Brookline, MA (US); Michael Scharland, Franklin, MA (US); Ran Margalit, Swarthmore, PA (US); Ishay Kedem, Brookline, MA (US); Leonard R. Linkens, Charlton, MA (US); William P. Powers, Jr., Sutton, MA (US)

(73) Assignee: EMC Corporation, Hopkinton, MA (US)

( * ) Notice: Subject to any disclaimer, the term of this patent is extended or adjusted under 35 U.S.C. 154(b) by 996 days.

(21) Appl. No.: 11/563,450

(22) Filed: Nov. 27, 2006

(65) Prior Publication Data

US 2008/0126913 A1    May 29, 2008

(51) Int. Cl.
*G06F 11/00* (2006.01)
(52) U.S. Cl. .......................... 714/6; 714/15
(58) Field of Classification Search ............ 714/6, 714/15, 54, 758
See application file for complete search history.

(56) References Cited

U.S. PATENT DOCUMENTS

| | | | | |
|---|---|---|---|---|
| 5,684,944 A * | 11/1997 | Lubbers et al. | | 714/6 |
| 6,014,756 A * | 1/2000 | Dottling et al. | | 714/15 |
| 6,446,237 B1 * | 9/2002 | Menon | | 714/800 |
| 6,904,547 B2 * | 6/2005 | Gittins et al. | | 714/54 |
| 7,337,371 B2 * | 2/2008 | Kuo et al. | | 714/52 |
| 7,487,394 B2 * | 2/2009 | Forhan et al. | | 714/15 |
| 7,529,982 B1 * | 5/2009 | Coatney et al. | | 714/54 |
| 2005/0283650 A1 * | 12/2005 | Zhang et al. | | 714/6 |
| 2008/0201608 A1 * | 8/2008 | Forhan et al. | | 714/15 |
| 2009/0254721 A1 * | 10/2009 | Suzuki et al. | | 711/162 |

* cited by examiner

*Primary Examiner*—Marc Duncan
(74) *Attorney, Agent, or Firm*—Muirhead and Saturnelli, LLC

(57) ABSTRACT

A method for managing data in a computer system comprises identifying a data-set that has data unit protection that is suspected of having been corrupted, suspending a data unit protection process for the data-set; deferring re-establishing the data unit protection process for the data-set until issuance of a request for an I/O operation for the data unit; and re-establishing the data unit protection process for the data-set in response to the request and before the I/O operation is conducted. The data has a data unit protection invalidity indicator for indicating that the data-set has data unit protection that is suspected of having been corrupted; and the data unit protection process is suspended in the presence of the data-set protection invalidity indicator. Meta-data protection that is suspected of having been corrupted may be used to identify a corrupted data-set.

20 Claims, 9 Drawing Sheets

METHODS AND SYSTEMS FOR MANAGING CORRUPTED META-DATA IN A COMPUTER SYSTEM OR NETWORK

RELATED APPLICATIONS

This application is related to co-pending U.S. patent application Ser. No. 11/563,467, entitled METHODS AND SYSTEMS FOR RECOVERING META-DATA IN A CACHE MEMORY AFTER A CORRUPTION EVENT, filed on even date herewith, and hereby incorporated by reference.

BACKGROUND OF THE INVENTION

1. Field of the Invention

The present invention relates generally to data management, and more particularly, but without limitation, to the management of data in a computer system.

2. Description of the Prior Art

Computer systems may include different resources that may be coupled to and used by one or more host processors. Resources and host processors may be interconnected by one or more communication connections. Data is transmitted in a computer system from component to component and even from computer system to computer system in a computer network. Further data is stored on and operated on in the host processors and in the resources, which may include, for example, data storage systems that provide storage services to each host processor.

An example data storage system may include one or more data storage devices that are connected together and may be used to provide common data storage for one or more host processors in a computer system. Data storage systems may also have cache memory connected to the data storage devices for storing frequently accessed data for rapid access. Typically, it is time-consuming to fetch or compute data stored in the data storage devices. However, once data is stored in the cache memory, future use can be made by accessing the cached copy rather than re-fetching or re-computing the original data, so that average access time to data may be made lower.

Many approaches have been developed for protecting critical data, whether transmitted in a computer system or network or stored in a data storage system, against loss resulting from power failures or transients, equipment malfunctions and other causes. In one approach, all of, or selected portions of, the stored data can be transferred to tape or other backup media thereby to provide backups of the resources such as the cache memory system by providing a "snapshot" of the resource at the time of the backup. In the event of a data loss, the backup copy could then be used to restore the data to the operational digital data system. However, the time to complete such a backup may be extensive. It may also take a significant time to restore the information, particularly if a storage system, such as a disk drive, fails completely.

In data processing systems that require essentially full-time availability and that incorporate large memory systems, data restoration may involve providing backup power, such as batteries, to the data system so that, upon power loss, data stored in more volatile memory systems can be written onto storage devices such as disks involving less volatile data storage. Once power is restored, the memory tables can be rebuilt. However, when the batteries are deflected or have failed, and the system is not provided sufficient time and power to store the data onto storage devices such as disks, it may be necessary to recover the meta-data on an entry by entry basis.

During typical operation of a data storage system, only about 5-10% of the data files are active at a time. Typically, also, only the data files that are active at the time of a system crash face corruption due to the crash. Therefore, only a small percentage of the data files in the cache memory are potentially corrupted. The vast majority of the data files, which were not active at the time of the crash, are not likely to have been corrupted and do not need to be retrieved from the data storage devices and rewritten into the cache memory. Repopulating the entire cache memory means that significant time and effort will be taken to retrieve data that does not need to be retrieved. Therefore, it is should not be necessary to repopulate the entire cache memory after a potential data corruption.

It is therefore advantageous to restore critical data with minimal interruption to normal operation of the computer system or network or access to the data stored in the data storage system.

SUMMARY OF THE INVENTION

Additional advantages of the invention will be set forth in part in the description which follows, and in part will be obvious from the description, or may be learned by practice of the invention. The advantages of the invention will be realized and attained by means of the elements and combinations particularly pointed out in the appended claims and equivalents thereof.

In accordance with the purpose of the invention, as embodied and broadly described herein, in one embodiment, the invention comprises a method for managing data in a computer system, with the data comprising a data-set having a data unit and meta-data associated with the data unit, and with the data having data unit protection and a data unit protection process associated therewith. The method comprises identifying a corrupted data set comprising a data-set that has data unit protection that is suspected of having been corrupted, suspending a data unit protection process for the corrupted data-set; deferring re-establishing the data unit protection process for the corrupted data-set until issuance of a request for an I/O operation for the data-set; and re-establishing the data unit protection process for the corrupted data-set in response to the request and before the I/O operation is conducted. In one embodiment, the data has meta-data protection for use in verifying the validity of the meta-data, and identifying a corrupted data-set comprises identifying a data-set that has meta-data protection that is suspected of having been corrupted.

The data has a data unit protection invalidity indicator for indicating that the data-set has data unit protection that is suspected of having been corrupted; and the data unit protection process is suspended in the presence of the data unit protection invalidity indicator. The data unit data unit has associated therewith a stored data unit protection value for use in verifying the validity of the data unit. Re-establishing the data unit protection process for the data-set further comprises creating a recalculated data unit protection value and replacing the stored data unit protection value with the recalculated data unit protection value; and removing the data unit protection invalidity indicator from association with the corrupted data-set.

In another embodiment, the invention comprises a method for managing I/O operations for data in a computer system, with the data comprising a data-set having a data unit and meta-data associated with the data unit, and with the data having data unit protection and a data unit protection process associated therewith. The method comprises receiving a request for an I/O operation for a data-set having a data unit protection process associated therewith and for which the data unit protection process has been suspended; and re-establishing the data unit protection process for the data-set in response to the request and before the I/O operation is conducted.

The data unit has associated therewith a stored data unit protection value for use in verifying the validity of the data unit. Re-establishing the data unit protection process for the data-set further comprises creating a recalculated data unit protection value and replacing the stored data unit protection value with the recalculated data unit protection value; and removing the data unit protection invalidity indicator from association with the corrupted data-set.

In one embodiment, the data has meta-data protection for use in verifying the validity of the meta-data, and identifying a corrupted data-set comprises identifying a data-set that has meta-data protection that is suspected of having been corrupted. In another embodiment, the method further comprises identifying a corrupted data-set, comprising a data-set that has data unit protection that is suspected of having been corrupted, and suspending the data unit protection process for the corrupted data-set.

In one embodiment of the invention, the data unit is stored in a cache memory. In other embodiments, the data unit is stored in a logical volume, or is in transit between components of a computer system. In other embodiments, the data comprises data in transit in a data communications network.

In other embodiments, the invention comprises a computer program product residing on a computer readable medium for managing data in a computer system, with the data having a data unit protection process associated therewith. The computer program product comprises instructions for causing a computer to identify a corrupted data-set comprising a data-set that has data protection that is suspected of having been corrupted; suspend the data unit protection process for the data-set; defer re-establishing the data unit protection process for the data-set until issuance of a request for an I/O operation for the data-set; and re-establish the data unit protection process for the data-set in response to the request and before the I/O operation is conducted. In a further aspect of the invention, the data-set has a data unit protection invalidity indicator for indicating that the data-set has data unit protection that is suspected of having been corrupted; and instructions are provided for causing a computer to suspend the data unit protection process for the data-set in the presence of the data unit protection invalidity indicator.

In a further embodiment of the invention, the invention comprises a computer program product residing on a computer readable medium for managing I/O operations for data in a computer system, with the data comprising a data-set having data unit and meta-data associated with the data unit, and with the data having data unit protection and a data unit protection process associated therewith. The computer program product has instructions for causing a computer to receive a request for an I/O operation for a data-set having a data unit protection process associated therewith and for which the data unit protection process has been suspended; and re-establish the data unit protection process for the data-set in response to the request and before the I/O operation is conducted.

In one embodiment, the data unit has associated therewith a stored data unit protection value for use in verifying the validity of the data unit. The instructions further comprise instructions to create a recalculated data unit protection value and to replace the stored data unit protection value with the recalculated data unit protection value; and removing the data unit protection invalidity indicator from association with the corrupted data-set.

In one embodiment, the data has meta-data protection for use in verifying the validity of the meta-data, and the computer program product has instructions for identifying a corrupted data-set that comprises identifying a data-set that has meta-data protection that is suspected of having been corrupted. In another embodiment, the computer program product has instructions for identifying a corrupted data-set, comprising a data-set that has data unit protection that is suspected of having been corrupted, and suspending the data unit protection process for the corrupted data-set.

In a further embodiment of the invention, the invention comprises a data storage system comprising a data storage device for storing a data unit. The data storage system also has a meta-data associated with the data unit having a data unit protection process and a data unit protection invalidity indicator for indicating suspension of the data unit protection process associated with the data unit. The invention also comprises a processor coupled to the data storage device and operable to manage the data unit on the basis of the meta-data associated therewith. The processor is further operable to receive a request for an I/O operation for the data unit, recognize the presence of the data unit protection invalidity indicator; and identify a data unit for which suspension of the data unit protection process is desirable; suspend the data unit protection process for the data unit by setting the data unit protection invalidity indicator; defer re-establishing the data unit protection process for the data unit until issuance of a request for an I/O operation for the data unit; and re-establish the data unit protection process for the data unit in response to the request and before the I/O operation is conducted, in addition removing the data unit protection invalidity indicator from the meta-data.

In a further embodiment of the invention, the invention comprises a data storage system comprising a data storage device for storing a data unit having a data unit protection process associated therewith. The data storage system also has meta-data associated with the data unit and a data unit protection invalidity indicator for indicating suspension of the data unit protection process associated with the data unit. The invention further has a processor coupled to the data storage device and operable to manage I/O operations for the data unit on the basis of the meta-data associated therewith. The processor is further operable to receive a request for an I/O operation for the data unit; recognize the presence of the data unit protection invalidity indicator; and re-establish the data unit protection process for the data unit in response to the request and before the I/O operation is conducted, in addition removing the data unit protection invalidity indicator from the meta-data.

In one embodiment, the data unit has associated therewith a stored data unit protection value for use in verifying the validity of the data unit. The processor is operable to create a recalculated data unit protection value and to replace the stored data unit protection value with the recalculated data unit protection value.

In one embodiment, the data has meta-data protection for use in verifying the validity of the meta-data, and the identifying a corrupted data-set comprises the processor being operable to identify a data-set that has meta-data protection that is suspected of having been corrupted. In another embodiment, the processor is operable to identify a corrupted data-set and suspend the data unit protection process for the corrupted data-set.

Using the invention herein described, it is possible to provide a user with access to data relatively soon after a potential corruption event. Where, previously, a user would have had to wait to obtain access to data until all of the data had been examined and repaired or rebuilt, if possible, even if the user did not need access to all of the data. Use of the deferred rebuild mode provided by the present invention limits rebuilding of data to data that is currently needed for the operation of the computer system. In this way, users do not have to wait for extensive periods of time for data that is not currently needed to be repaired, and a user is still assured that data that is suspected of having been corrupted will be reviewed before the data are used.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

DESCRIPTION OF THE PREFERRED EMBODIMENT(S)

Reference is now made in detail to exemplary embodiments of the invention, examples of which are illustrated in the accompanying drawings.

Figure 1:
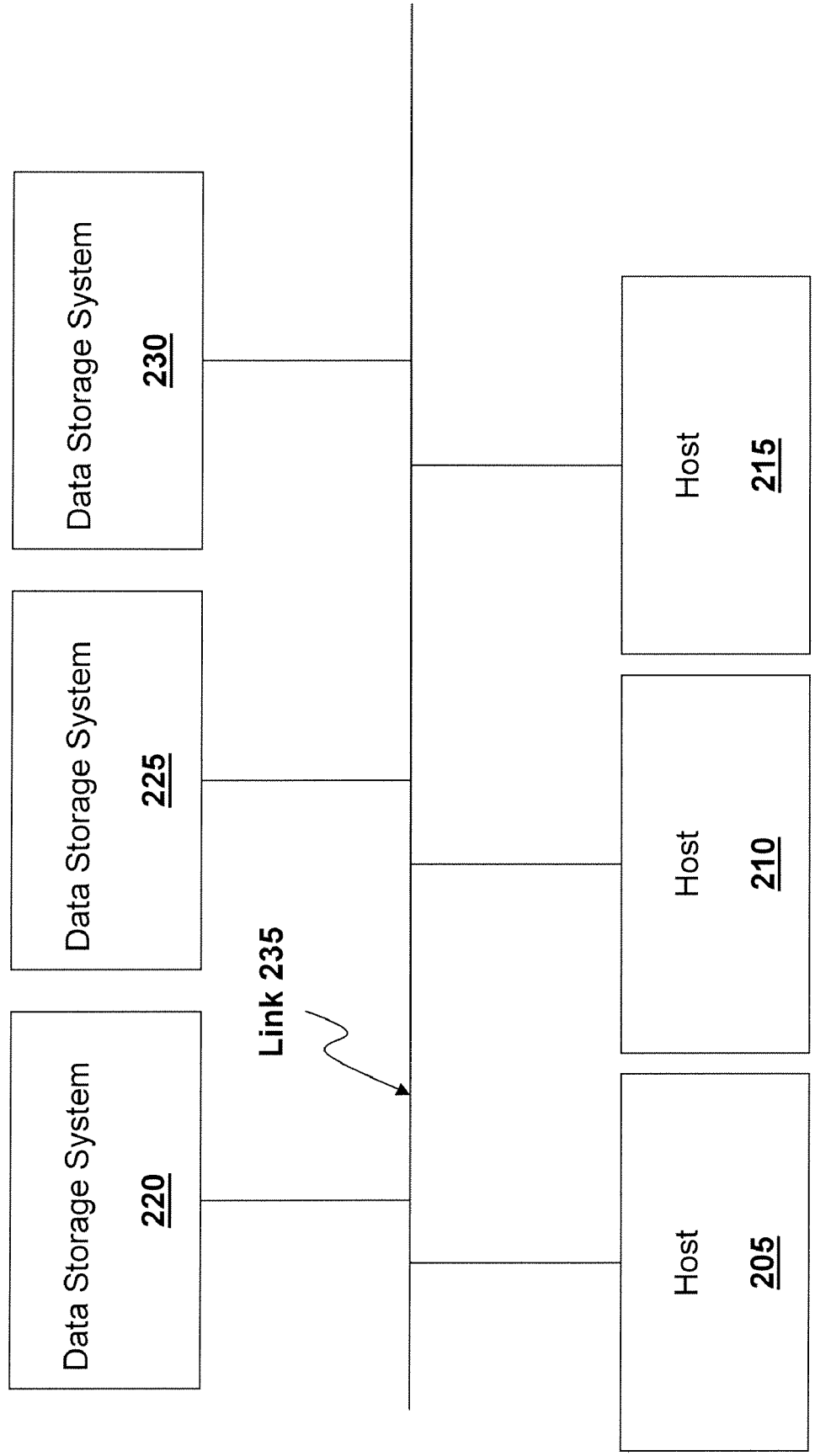
FIG. 1 is a block diagram of a functional architecture for a computer system, according to an embodiment of the invention.

FIG. 1 is a block diagram of a functional architecture for a computer system, according to an embodiment of the invention. Computer systems may include different resources that may be coupled to and used by one or more host processors. These resources may include, for example, data storage systems such as the SYMMETRIX™ family of data storage systems manufactured by EMC Corporation, of Hopkinton, Mass. Resources and host processors may be interconnected by one or more communication connections. As shown in FIG. 1, host processors, or hosts, or host systems 205, 210, and 215, are coupled to each of data storage systems 220, 225, and 230, via link 235. Link 235 may be or include the Internet, an intranet, a wired link, a wireless link, or other link, and may utilize Transmission Control Protocol/Internet Protocol (TCP/IP), Small Computer System Interface (SCSI), Fibre Channel, or other communications protocol. Link 235 may also represent a plurality of links of the same or different types; all or a portion of these links may be redundant. Any host can access data in any one or more data storage systems, and data may be transferred between data storage systems.

Variations to the architecture illustrated in FIG. 1 are possible. For example, the number of hosts need not equal the number of data storage systems. And there is no theoretical limit to the number of either type of functional component.

Figure 2:
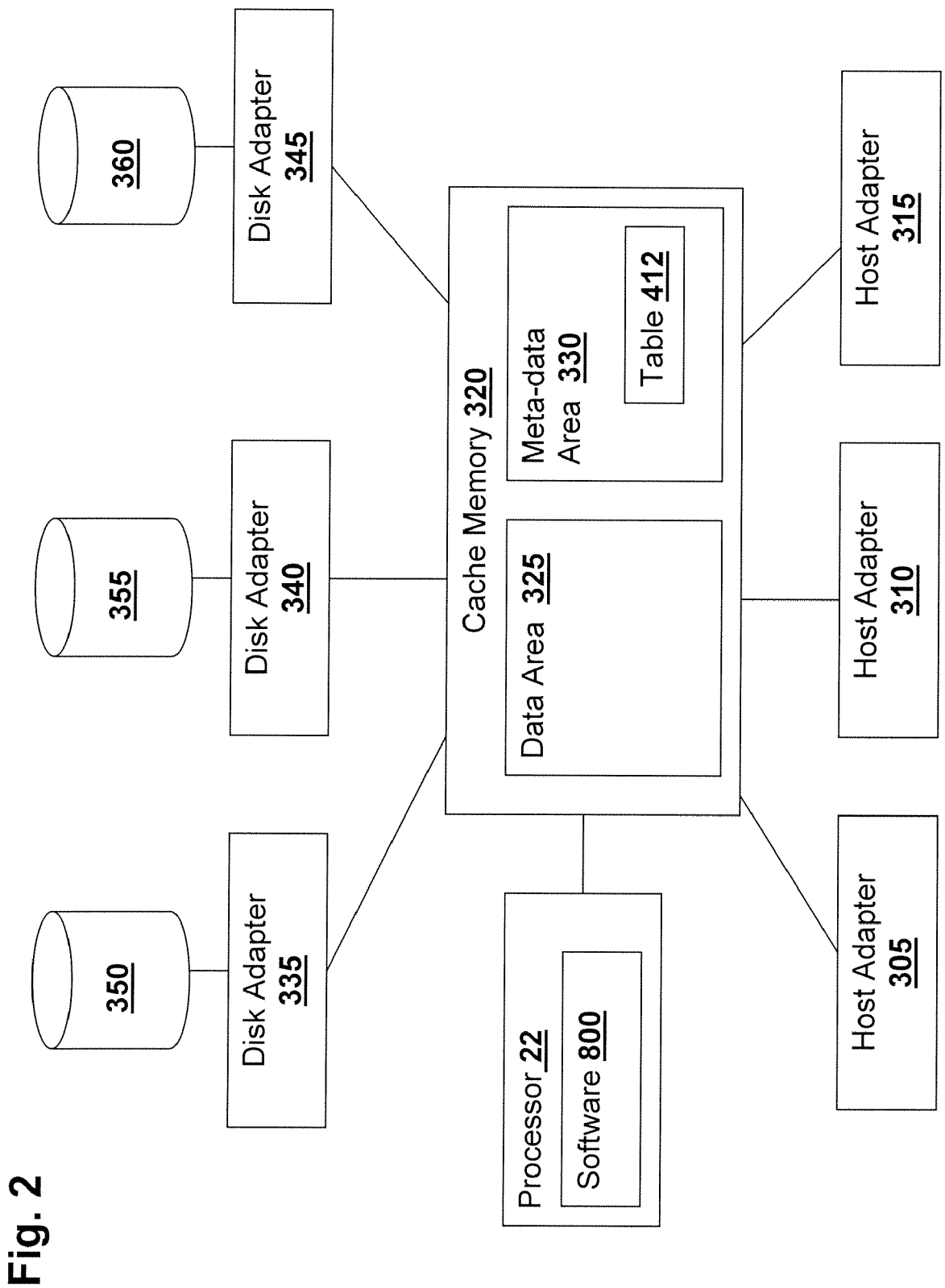
FIG. 2 is a block diagram of a functional architecture of a data storage system in a computer system, according to an embodiment of the invention.

FIG. 2 is a block diagram of a functional architecture of a data storage system 220, according to an embodiment of the invention. The block diagram illustrated in FIG. 2 represents an exemplary embodiment of any one or more of data storage systems 220, 225, and 230. As illustrated in FIG. 2, the system 220 may also include one or more host adapters 305, 310, and 315, which are coupled to a cache memory 320. One or more of the host adapters 305, 310, and 315 may be or include, for example, a Fibre Channel adapter. In operation, the host adapters 305, 310, and 315 provide a communication interface for any one or more of host systems 205, 210, 215, and may be used to manage communications and data operations between one or more host systems and the cache memory.

Each of the disk adapters 335, 340, and 345 are coupled to and between the cache memory 320 and a corresponding one of the data storage devices 350, 355, and 360. The disk adapters 335, 340, and 345 are responsible for the backend management of operations to and from a portion of the data storage devices 350, 355, 360. Each of the data storage devices 350, 355, 360 may be physical devices, such as disks, and may be organized and segmented into one or more logical volumes (LVs) 380, which are logical representations of physical volumes.

Variations to the architecture illustrated in FIG. 2 are possible. For example, each one or more of the disk adapters 335, 340, and 345 may manage read and write operations associated with more than a single disk. Moreover, any one or more disks associated with a disk adapter may be considered a logical volume 380, although the term logical volume is not intended to be limited by this example.

As also illustrated in FIG. 2, the cache memory 320 may include a data area 325 and meta-data area 330. The data area 325 is an area of cache memory 320 containing cache-slots for relatively temporary in-cache storage of data units. The data area provides relatively quick access to data units as compared to the operation of data storage devices 350, 355, and 360. The meta-data area 330 stores meta-data, or information about data units stored in data storage devices 350, 355, and 360. The meta-data area 330 may have a table 412 that is indexed, for example, by track or other portion of a logical volume 380, for storing the meta-data.

Each of the disk adapters 335, 340, and 345 control data read and write operations associated with corresponding data storage devices 350, 355, and 360. Each of the disk adapters 335, 340, and 345 may also enable communications between a corresponding data storage device and the cache memory 320. The cache memory 320 may facilitate data transfer between any one of the host adapters 305, 310, and 315, and any one of the disk adapters 335, 340, and 345. In addition, to the extent that data residing in data storage devices 350, 355, and 360 may be transferred between disks, the cache memory 320 may facilitate such disk-to-disk data transfer.

The disk adapters 335, 340, and 345 may perform data operations to and from the cache memory 320, for example, in communications with other disk processors or directors, and other components of the data storage system. Generally, the cache memory 320 may be used in facilitating communications between components in the data storage system.

The particular data storage system as described in this embodiment, such as a SYMMETRIX™ system by EMC Corporation, of Hopkinton, Mass. or a disk, should not be construed as a limitation. Other types of commercially available data storage systems, as well as processors and hardware controlling access to these particular devices, may be also be included in an embodiment.

An embodiment of a data storage system 220 may include a processor 22 used to manage and monitor the system 220. The processor 22 may be any one of a variety of commercially available processors, such as an INTEL-based processor, and the like.

In one embodiment, the processor 22 may be used to mange cache data in cache memory 320 by a user, such as hosts 205, 210, and 210 through the connection 32. The processor 22 may use a computer program product in the form of cache memory control software 800 to manage access to data stored in the cache memory 320.

In the embodiment of the present invention illustrated in FIG. 2, the cache memory control software 800 resides on a computer readable medium in processor 22. It will be understood by those skilled in the art that the computer program product defining the operations and methods herein described are deliverable to a computer such as processor 22 in many forms, including but not limited to (1) being permanently stored on non-volatile Read only Memory (ROM) or (2) being alterably stored on writable storage media such as compact disks (CDs), random access memory (RAM) devices, floppy disks, and other magnetic and optical media, or (3) being conveyed to a computer through communication media, for example using baseband signaling or broadband signaling techniques, as in an electronic network such as the Internet or telephone modem lines. The operations and methods may be implemented in a software executable out of a memory by a computer such as processor 22 or as a set of instructions embedded in a carrier wave. Alternatively the operations and methods may be embodied in whole or in part using hardware components such as Application Specific Integrated Circuits (ASICs), state machines, controllers or other hardware components or devices, or a combination of hardware and software components.

In addition, although the details of the memory control software 800 may reside in a particular processor 22 associated with a data storage system 220, similar software components may exist in each of the other processors associated with other SYMMETRIX™ storage systems such as 225, 230. In other embodiments, this software 800 may also reside on any of the host systems 205, 210, 215 or on computer readable medium accessible by host systems 205, 210, 215 or processor 22.

As used herein, the meta-data table 412 refers broadly to a collection of meta-data for ready reference. In an embodiment of the invention, there may be a portion of a meta-data table associated with each portion of a logical volume 380. Virtually every operation conducted by the data storage system 220 will access the meta-data table 412. It is accessed, for example, when a track needs to be locked or unlocked, when it is necessary to identify whether or not a track is in cache, or whether a mirror is valid, or while application bits need to be set.

Figure 3:
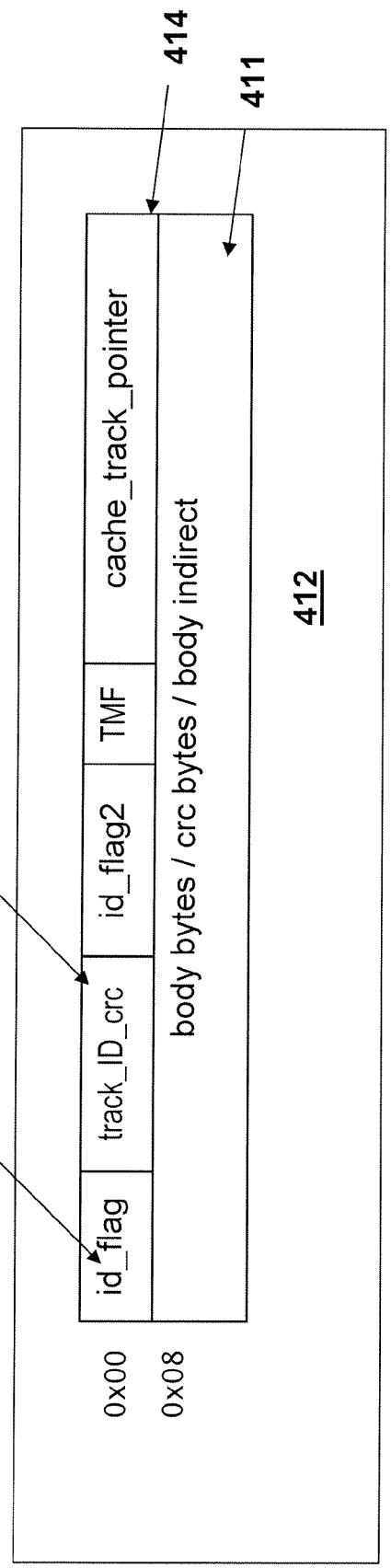
FIG. 3 is a block diagram of a table entry in a table in the meta-data area 330 shown in FIG. 2.

Variations to the meta-data table 412 illustrated in FIG. 3 are possible. For example, the size of the portion of the logical volume 380 for which there is meta-data may vary. For instance, each portion of the logical volume may be 64K bytes (i.e., a track as that term is used herein). Alternatively, each portion of the logical volume may be larger or smaller. Where a logical volume is separated into smaller portions, more meta-data will be required. Similarly, where a logical volume is separated into larger portions, fewer meta-data will be required. The selection of the size of the portion of the logical volume is a trade-off between the amount of data needed to record the state of the logical volume and the granularity at which the state is recorded. For another example, the size of the portion of the meta-data table corresponding to a portion of a logical volume could be other than 16 bytes, and the type and position of application designations may be different than illustrated in FIGS. 3 and 4. Moreover, in alternative embodiments, there may be a separate meta-data table for each portion of a logical volume.

A meta-data table 412 may have multiple table entries 414, also known as track IDs or TIDs, each comprising multiple fields. FIG. 3 is an illustration of a meta-data table entry 414 for storing the meta-data, according to an embodiment of the invention. As shown in FIG. 3, table entry 414 indicates application designations for each field of the meta-data area 330. In the illustrated embodiment, the table entry 414 has a track_ID_crc field 416, for storing a meta-data protection value 417 useful in protecting against corruption; an id_flag2 field, for storing meta-data defining disk layout; a track_mirror_flag (TMF) field, for holding meta-data describing the status and other details about mirroring tracks; a cache_track_pointer field, for storing meta-data pointing to the location of a track in the cache; and body bytes/crc bytes/body indirect fields 411, for storing meta-data useful in describing the layout of the cache-slot 514 and protection of the data units regardless of their locations (disk or cache).

Figure 4:
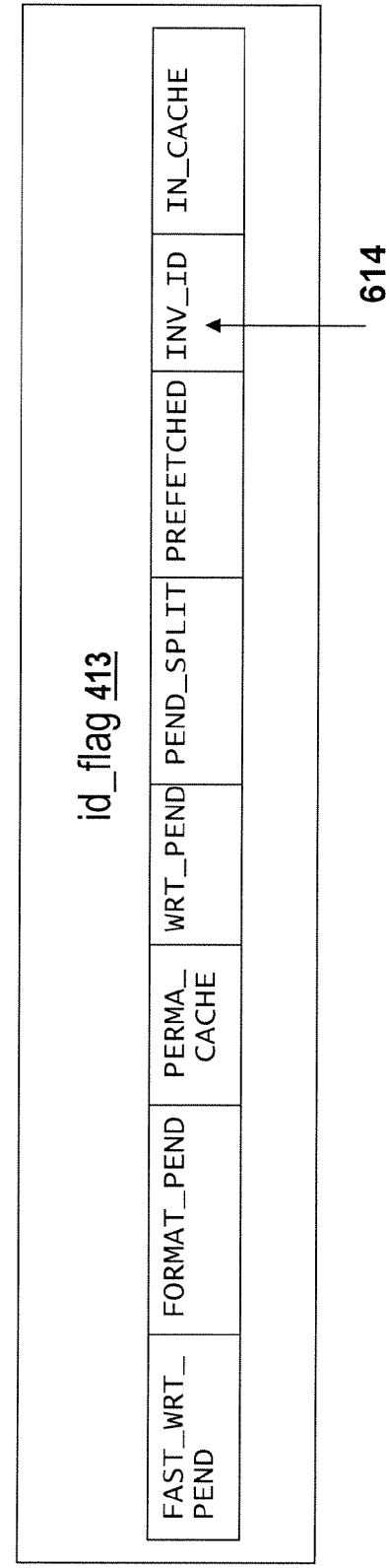
FIG. 4 is a block diagram of more detail of a table entry shown in FIG. 4.

The table entry 414 also has an id_flag field 413. As shown in FIG. 4, the id_flag field 413 is organized into multiple fields that could comprise sub-fields for storing meta-data describing the status of and other details about tracks. In the illustrated embodiment, the id_flag field 413 has an FAST_WRT_PEND field, for storing meta-data to identify the pendency of a fast write operation for the track; a FORMAT_PEND field, for storing meta-data identifying the pendency of a format change for the track; a WRT_PEND field, for storing meta-data identifying the pendency of a write operation for the track; a PREFETCHED field, for storing meta-data identifying whether the track has been prefetched into the cache 325; and an IN_CACHE flag, for indicating that a copy of the track may be found in the cache 325.

Figure 5A:
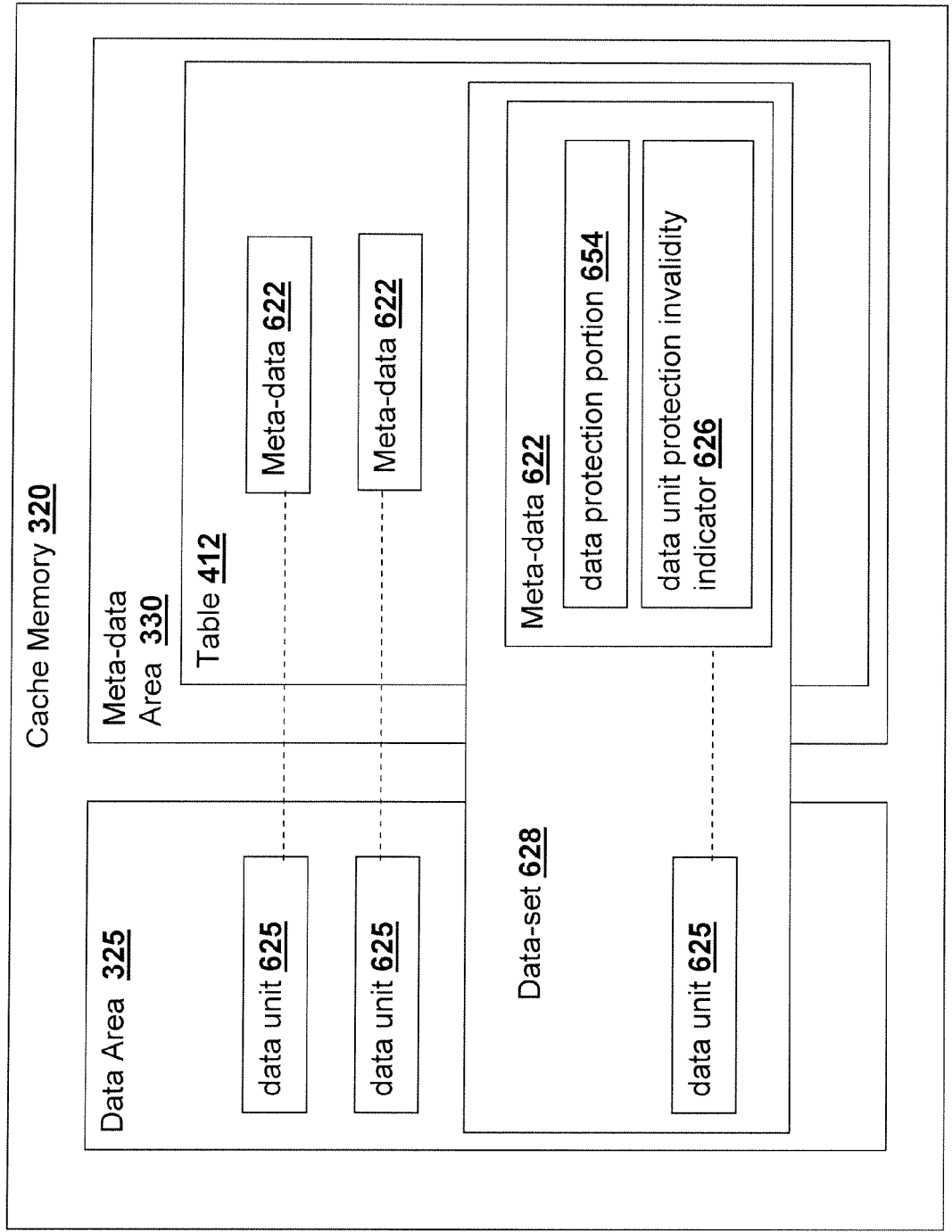
FIG. 5a is a block diagram showing the organization of data in the cache memory 320 in FIG. 2.

FIG. 5a is a block diagram showing the organization of data in the cache memory 320 in FIG. 2, according to one embodiment of the present invention. As noted above the cache memory 320 is organized into a data area 325 for storing data units, shown as 625, and a meta-data area 330 for storing meta-data, shown as 622 associated with the data unit 625. A data-set 628 comprises the data unit 625 and the meta-data (table entry 414) associated with the data unit 625. The cache-slot 514 in which the data unit is stored has a back-pointer to the table entry 414 with which is it associated and possibly a copy of the associated meta-data.

Figure 5B:
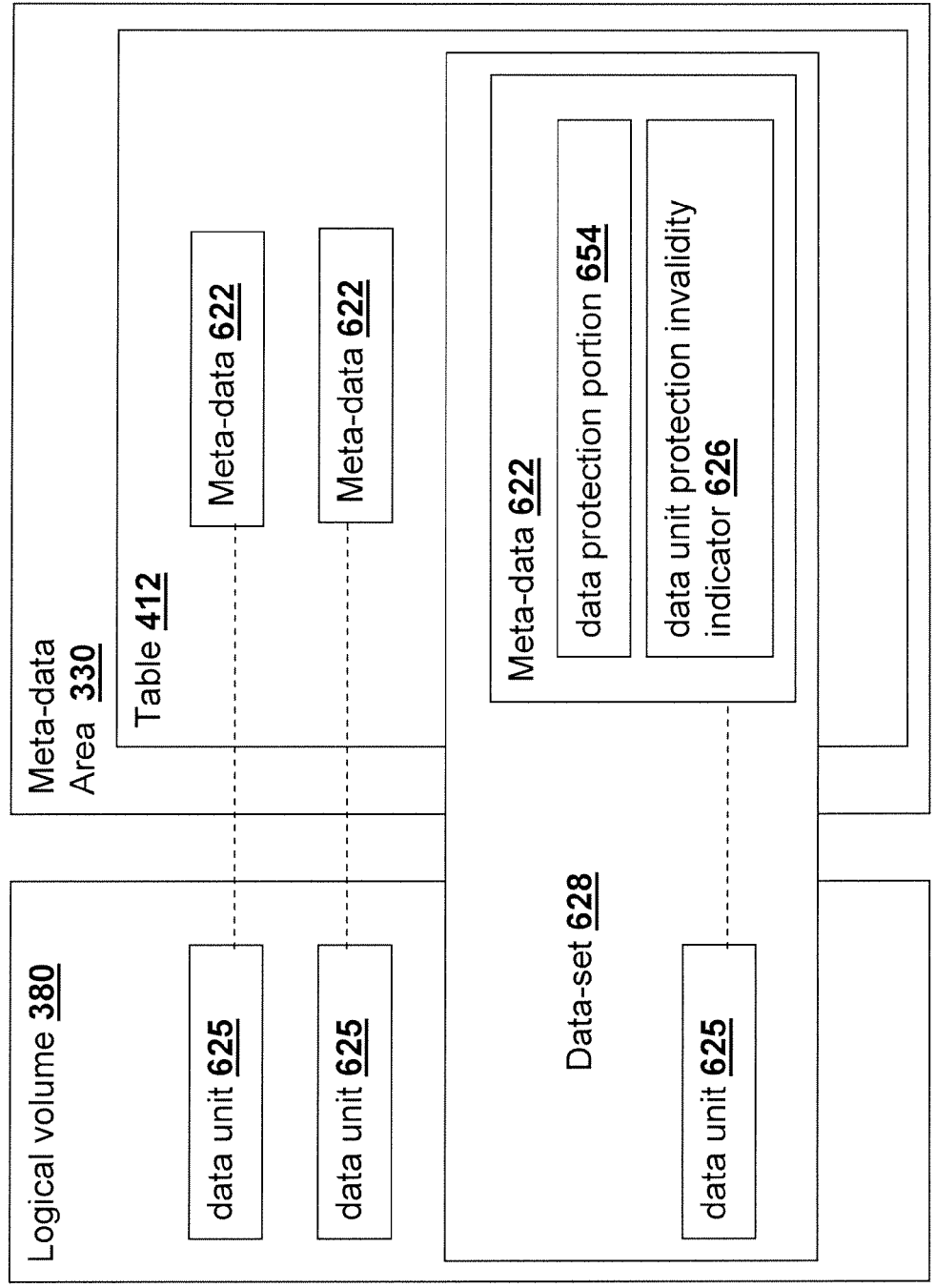
FIG. 5b is a block diagram showing the organization of data in a logical volume 380.

It should be noted that the current invention is not limited to the protection of data units in a cache memory. As noted above, each of the data storage devices 350, 355, 360 may be physical devices, such as disks, and may be organized and segmented into one or more logical volumes (LVs) 380, which are logical representations of physical volumes. Data units may be considered to be stored on data storage devices 350, 355, 360, or the logical volumes 380. FIG. 5b is a block diagram showing the organization of data sets, according to one embodiment of the present invention, in which table entries 412 are associated with data sets on a logical volume 380. As noted above, the logical volume 380 stores data units, shown as 625, and the meta-data area 330 of the cache memory 320 has meta-data, shown as 622 associated with each data unit 625. A data-set 628 comprises the data unit 625 and the meta-data (table entry 414) associated with the data unit 625, no matter where the data unit 625 is stored.

Figure 6:
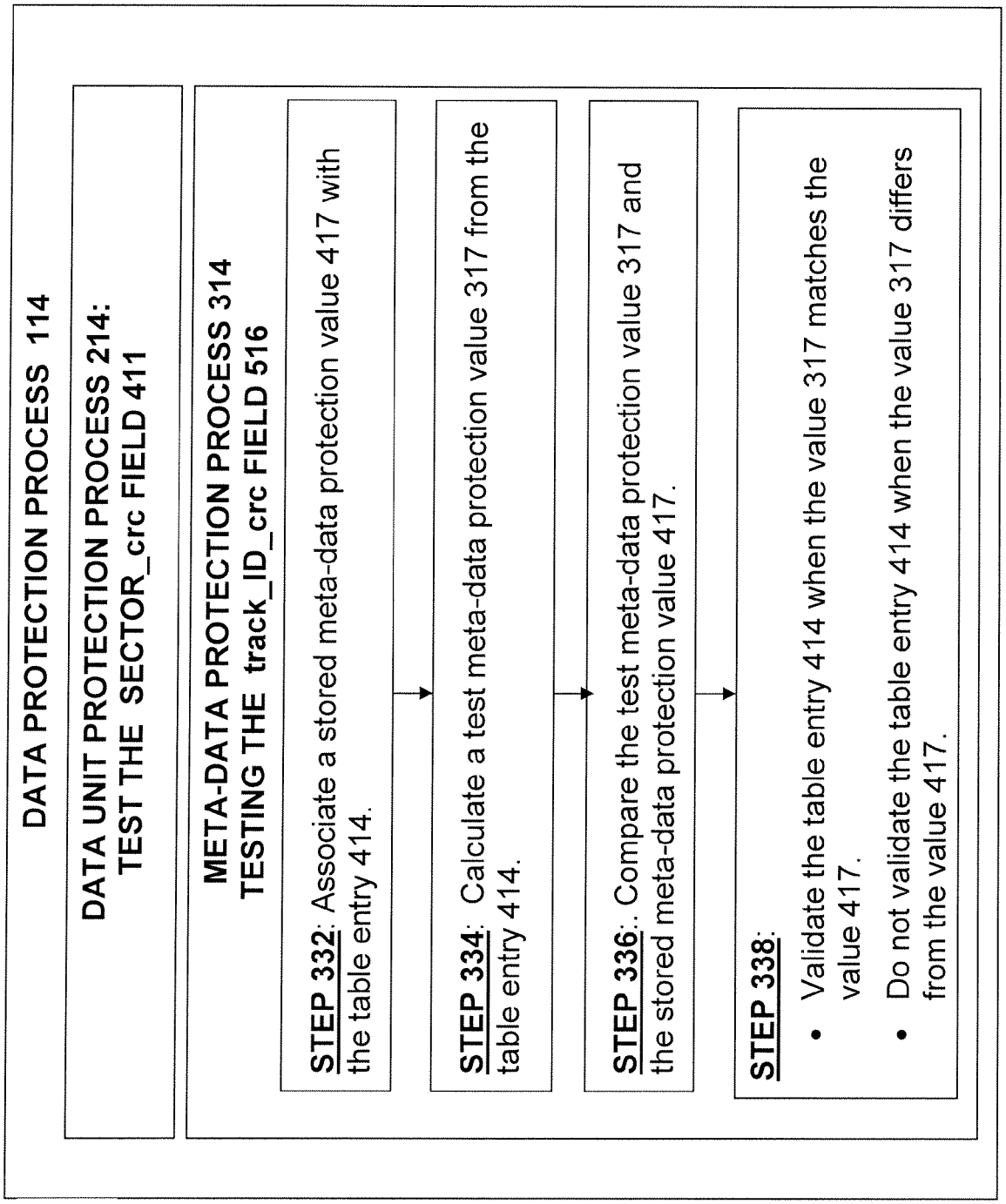
FIG. 6 is a flow diagram of a data protection process 114 for validating the protection of data according to an embodiment of the invention.

On most accesses, the integrity of the table entry 414 is verified by checking the track_ID_crc field 416 using the meta-data protection process 314 shown in FIG. 6. In a step 332, the meta-data protection process 314 starts by associating a stored meta-data protection value 417 with the data-set. The track_ID_crc field 416 holds stored meta-data protection value 417, which is an exclusive-OR (XOR) of all of a portion of the meta-data in the table entry 414 and is used to confirm the validity of the table entry 414.

Any update to the table entry 414 requires an update to the track_ID_crc field 416, namely a recalculation of a track_ID_crc value 417 and storage of the recalculated value in the track_ID_crc field 416. Any access (read/write/administrative) of the table entry 414 requires a validation of the contents of the track_ID_crc field 416. Validation involves a step 334 of recalculating the track_ID_crc value 417 to form a test meta-data protection value 317 and a step 336 of comparing it to the stored meta-data protection value 417 in the track_ID_crc field 416. When the contents do not match the recalculated track_ID_crc value 417, the table entry 414 is not considered protected. In a step 338, the data-set 628 is validated when the test meta-data protection value 317 matches the stored meta-data protection value 417. It is not validated when the test meta-data protection value 317 differs from the stored meta-data protection value 417.

When the contents of the track_ID_crc field are found to be wrong, every bit of information in the table entry 414 is suspected of corruption. As noted above, the contents of the IN_CACHE field indicates that a copy of the track may be found in the cache 325. When the IN_CACHE field is set, the cache_track_pointer field points to the location of the track in the cache. If the IN_CACHE flag is not set, the meta-data in the cache_track_pointer field is meaningless. Because the cache_track_pointer field is not cleared when a track goes out-of-cache, if corruption of the table entry 414 causes the IN-CACHE field to switch its setting from "not set" to "set", the data storage system 220 would erroneously recognize that an out-cache-track is IN-CACHE and, using the meaningless address of the cache-slot (pointed by the contents in the cache_track_pointer field), send the user wrong data. Further, if a write operation then occurred, the data storage system 220 would write to the meaningless address, removing correct information at the address and corrupting the data to another track.

In order to prevent improper reading and writing, the id_flag field 413 is provided with the INV_ID field 614 for indicating whether the data unit protection for the data unit stored in the track, as it is currently stored in the data area 325, is valid or potentially invalid. Generally, the invalidity field 614 constitutes a data unit protection invalidity indicator 626, and setting the invalidity field 614 thus constitutes providing a data unit protection invalidity flag for indicating that the protection for the data unit stored in the track associated with the field 614, as it is currently stored in the data area 325, is not valid, for example, upon corruption of all or part of the cache.

The setting of the invalidity field 614 may be used to defer repairing the meta-data associated with the of cache data in the event of a corruption or potential corruption, until it is needed by a user. It should be noted that the meta-data protection process 314 only partially verifies the data protection portion of the table entry 414. It verifies the validity of the meta-data protection of the table entry 414. It does not verify the validity of the data unit protection of the table entry, namely the SECTOR_crc part of the fields 411. The meta-data protection process 314 is only part of a data protection process 114, which also has a data unit protection process 214, for verifying the validity of the SECTOR_crc field by accessing the data unit, not in the cache memory, but on the logical volume on which it resides. Since such an access is time-consuming. It is not as time-consuming to verify the validity of the meta-data protection, since the meta-data protection is tested by creating the test meta-data protection value 317, which only requires an access to cache memory, not the logical volume.

Upon occurrence of a significant corruption event, it is not preferable to take the system off-line for the amount of time that would be required to access the logical volumes to validate the SECTOR_crc fields associated with all of the data units. It takes considerably less time to access the cache memory to validate the track_ID_crc fields 516 of all of the table entries in the cache memory.

Figure 7:
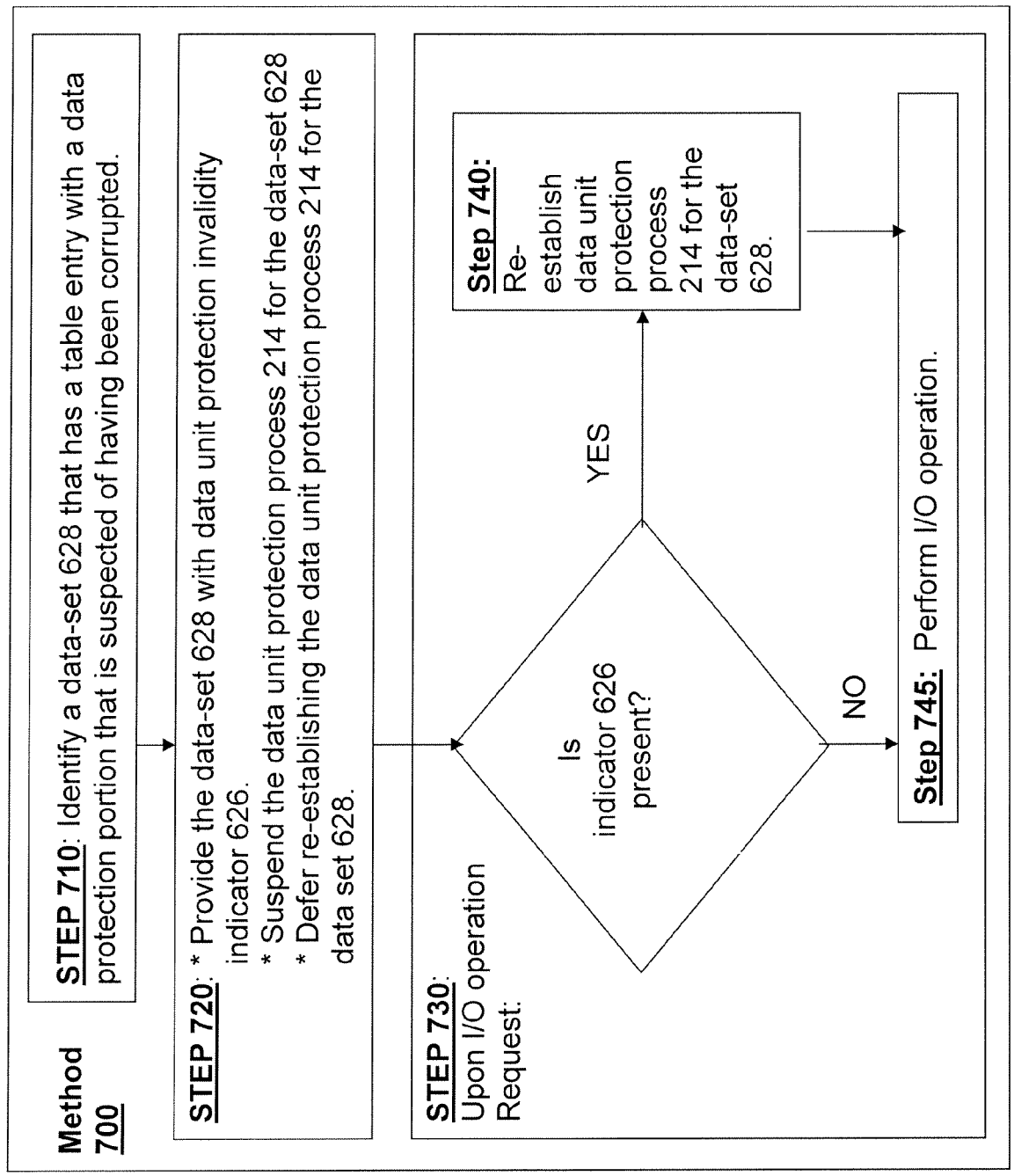
FIG. 7 is a flow diagram of a method for managing data in a computer system according to an embodiment of the invention.

The validity of the meta-data protection for the table entry 415 may be used as a predictor of the validity of the data unit protection, because, when corruption occurs, it is more likely that the data unit protection is invalid when the meta-data protection for the table entry 415 is rendered invalid also. Since it is less time-consuming to test the validity of the meta-data protection than it is to test the validity of the data unit protection, the present invention provides a mechanism to test the meta-data protection for all of the table entries of the meta data area, validate the table entries for which the meta-data protection is intact, and mark the table entries for which the meta-data protection is not intact, in order to identify the data-sets in need of validation by access to the logical volume. The invention also provides a mechanism to defer the access to the logical volume until the data-set is needed for an I/O operation. Alternatively, the access tot eh logical volumes may occur during the empty cycle of the data storage systems. In either case, suspending the data unit protection process for corrupted data-sets, in combination with deferring re-establishing the data unit protection process, provides quick access to the data-sets while preserving the ability to conduct a thorough recovery of the data-sets from a corruption event FIG. 7 is a flow diagram of a method 700 for managing access to the cache memory 320 shown in FIG. 2 according to an embodiment of the invention. Specifically, in operation, the method 700 begins in a step 710 by identifying at least one data-set 628 that has data unit protection that is suspected of having been corrupted. The method then proceeds to a step 720 of providing the data-set 628 with a data unit protection invalidity indicator 626. The data unit protection invalidity indicator 626 may be set in conjunction with the meta-data recovery method disclosed in co-pending U.S. patent application Ser. No. 11/563,467, entitled METHODS AND SYSTEMS FOR RECOVERING META-DATA IN A CACHE MEMORY AFTER A CORRUPTION EVENT, filed on even date herewith, in which meta-data corruption is identified and correction attempts are made. In one embodiment of the invention described in the above-identified application, the data unit protection invalidity indicator 626 is set when meta-data is identified as being out-of-cache or as being un-validated. The effect of setting a data unit protection invalidity indicator 626 is that the data unit protection process 214 for the data-set 628 is suspended or disabled.

Specifically, the presence of an indicator 626 means that the data unit protection for the data-set with which the indicator 626 is associated is incapable of being validated, and it should not be accessed until, for example, appropriate actions may be taken on the data in order to render the data once again suitable for accessing. The absence of an indicator 626 associated with a set of data means that the data-set is likely to be safely be accessed.

In a step 730, in response to a request for an I/O operation for the data unit 625, the data unit protection invalidity indicator 626 is examined. If it is found to be unset, in a step 745 the I/O operation proceeds as normal. If it is found to be set, in a step 740, the data unit protection process 214 is re-established for the data-set 628. After the data unit protection process 214 is re-established for the data-set 628, in the step 745, the I/O operation proceeds as normal.

Figure 8:
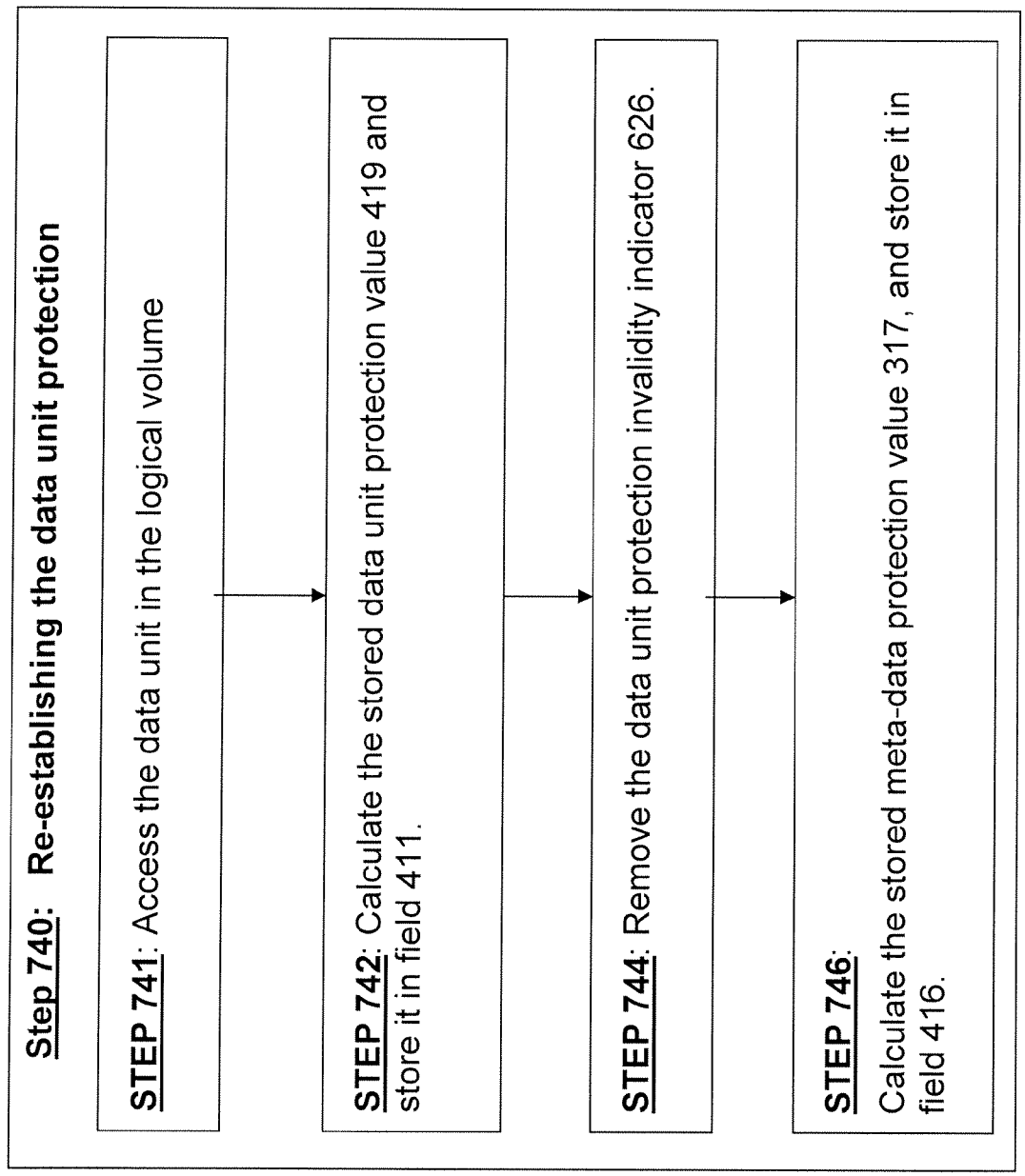
FIG. 8 is a flow diagram of further detail of step 740 in FIG. 7.

FIG. 8 is a flow diagram of the method for re-establishing the data unit data protection process 214, as conducted by step 740. Specifically, in a step 741, the data unit is accessed from the logical volume upon which the data unit resides. In a step 742, the data unit protection value 419 is calculated and stored in the SECTOR_crc field 411. In a step 744, the data unit protection invalidity indicator 626 is removed. Finally, in a step 746, the meta-data protection value 417 is recalculated and stored in the field 516. The I/O operation would then proceed in the expected normal way.

Figure 9:
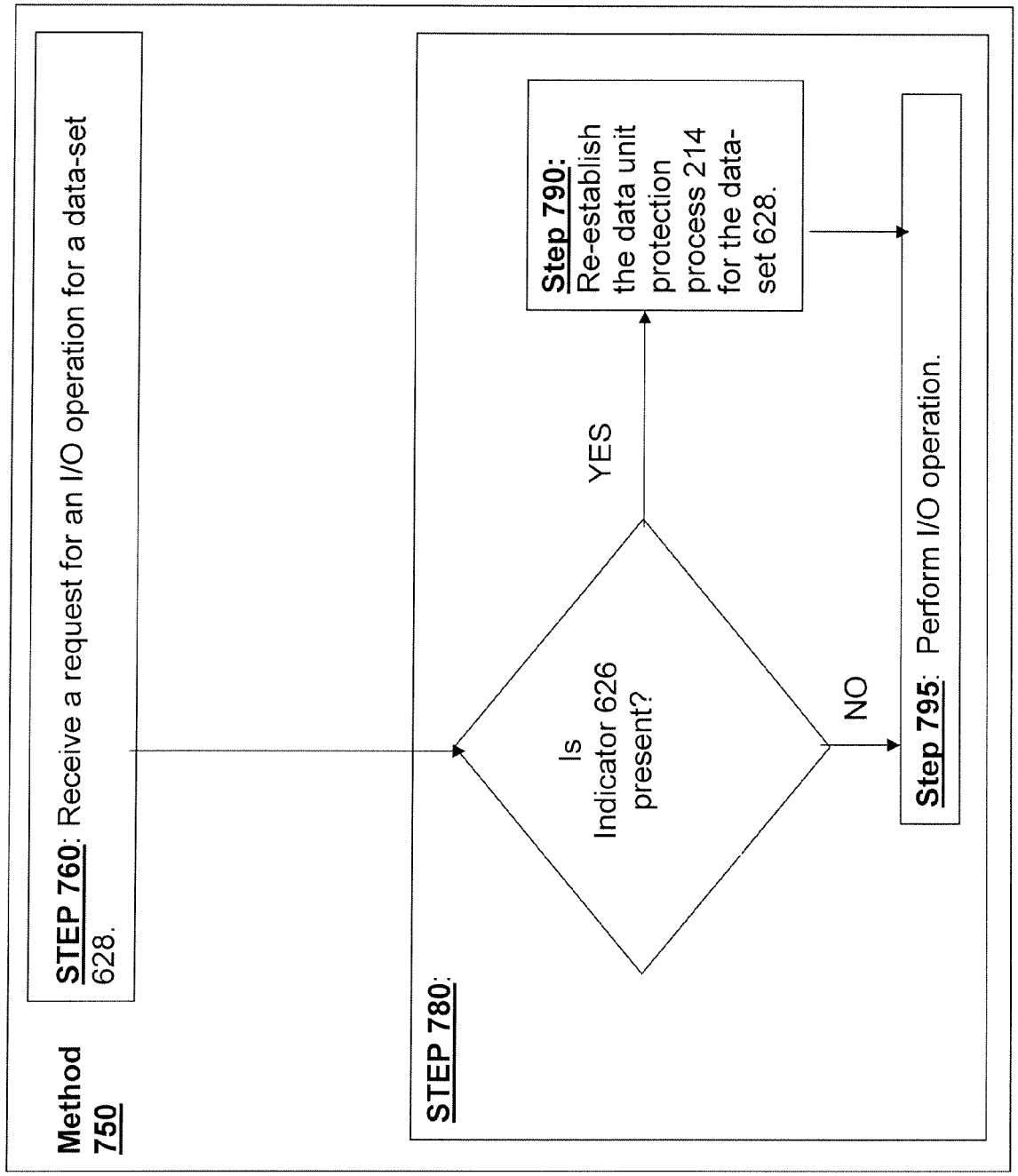
FIG. 9 is a flow diagram of a method for managing I/O operations for data in a computer system according to an embodiment of the invention.

FIG. 9 is a flow diagram of a method 750 in a further embodiment for managing I/O operations for data in a computer system. The method 750 starts with a step 760 of receiving a request for an I/O operation for a data-set 628. In response to the request, in a step 780, the method 750 proceeds to determine whether or not the data unit protection invalidity indicator 626 is present. If it is not present, meaning that the data unit protection for the data-set 628 is valid, the method 750 proceeds to a step 795 of performing the I/O operation. If it is present, demonstrating that the data unit protection process for the data-set has been suspended, the method 750 proceeds to a step 790 to re-establish the data unit protection process for the data-set. The step 790 may be conducted in the same manner as the step 740 of FIG. 8, in which a data protection value 419 is calculated and is used to replace the stored meta-data protection value 417 in the table entry 414 of the data-set 628, in which the data unit protection invalidity indicator 626 is removed, and in which the meta-data protection value 417 is recalculated and stored in the field 516. The I/O operation would then proceed in the expected normal way. The method 750 would then proceed to a step 795 of performing the I/O operation.

The method 700 may be embodied in a computer program product such as memory control software 800 residing on a computer readable medium for managing access to cache data in a cache memory 320. The memory control software 800 has instructions for causing a computer such as processor 22 to implement the method 700 shown in FIG. 7. Specifically it has instructions for performing step 710 of identifying at least one data-set in the cache 628 that has data unit protection that is suspected of having been corrupted, and a step 720 of providing the data-set 628 with a data unit protection invalidity indicator 626.

The software 800 also has instructions for performing step 730, in response to a request for an I/O operation for the data-set 628, of determining whether the data unit protection invalidity indicator 626 is set or unset. If the data unit protection invalidity indicator 626 is unset, the software 800 has instructions for performing the step 745 of performing an I/O operation as normal. If the data unit protection invalidity indicator 626 is set, the software 800 has instructions for performing the step 740 of re-establishing the data unit protection process 214 for the data-set 628. The software 800 also has instructions for performing the step 745, after the data unit protection process 214 is re-established for the data-set 628, of performing the I/O operation as normal.

The memory control software 800 may also have instructions for causing a computer such as processor 22 to implement the method 750 for managing I/O operations shown in FIG. 8. The software 800 also has instructions for performing step 760 of receiving a request for an I/O operation for a data-set 628 and for performing step 790 of determining whether or not the data unit protection invalidity indicator 626 is present. The software 800 has instructions for performing step 795 of performing the I/O operation if it is not present. It also has instructions for performing step 790 if it is present, for re-establishing the data unit protection process 214 for the data-set 628. The software 800 also has instructions for performing the step 790, after the data unit protection process 214 is re-established for the data-set 628, of performing the I/O operation as normal.

It can be seen that identifying data-sets that have data unit protection that is suspected of having been corrupted, suspending the data unit protection process for those data-sets; deferring re-establishing the data unit protection process for any data-set; and re-establishing the data unit protection process for the requested data-set in response to the request and before the I/O operation is conducted provides a data storage system, such as system 220, 225, 230, with a recovery mode in which repairs are limited only to that data that is needed by a user.

Deferral of repairs is desired because, as noted above, only a small subset of data is required to be accessed by the computer system at a given time. If repairing or rebuilding all available data that had been corrupted as a result of a corruption event were necessary before access was provided to data, the computer system would be subjected to unnecessary waiting time while unneeded data was being repaired. In the present invention, use of the data unit protection invalidity indicator results in postponing data repair until the data is needed. The computer system will still have to wait while the data that it needs is being repaired, and such time might still be extensive. However, the wait time required for the computer system to repair data that does not need to be repaired is eliminated with the present invention.

Therefore, with the present invention, access to a large amount of information in a data storage system memory is provided relatively quickly after a crash. Further, even though there may be extensive delays after a corruption event while critical data is being repaired, over time the delay will be reduced until normal operating access is eventually restored. Providing a data storage system with the present invention allows the computer system to return to being on-line more quickly than it would have been previously after a crash.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for managing data in a computer system, comprising:
    identifying a corrupted data-set, the corrupted data-set comprising a data-set that is subject to a data unit protection process that indicates the data-set as having been corrupted;
    suspending the data unit protection process for the corrupted data-set;
    deferring re-establishing the data unit protection process for the corrupted data-set; and
    after deferring, re-establishing the data unit protection process for the corrupted data-set in response to a request for an I/O operation for the corrupted data-set and before the I/O operation is conducted.

2. The method of claim 1, wherein the data has a data unit protection invalidity indicator for indicating that a data-set has data unit protection that is suspected of having been corrupted, and wherein the method further comprises:
    suspending the data unit protection process for the corrupted data-set in the presence of the data unit protection invalidity indicator.

3. The method of claim 1, wherein a data unit of the corrupted data-set has associated therewith a stored data unit protection value for use in verifying the validity of the data unit, and wherein re-establishing the data unit protection process for the corrupted data-set includes:
    creating a recalculated data unit protection value and replacing the stored data unit protection value with the recalculated data unit protection value; and
    removing a data unit protection invalidity indicator from association with the corrupted data-set.

4. The method of claim 1, wherein the data includes meta-data protection for use in verifying the validity of meta-data associated with the corrupted data-set, and wherein identifying the corrupted data-set includes identifying a data-set that has meta-data protection that is suspected of having been corrupted.

5. A method for managing I/O operations for data in a computer system, and comprising:
    receiving a request for an I/O operation for a data-set having a data unit protection process associated therewith, the data-set being indicated as a corrupted data-set, and for which the data unit protection process has been suspended; and
    re-establishing the data unit protection process for the data-set in response to the request and before the I/O operation is conducted.

6. The method of claim 5, wherein a data unit of the data-set has associated therewith a stored data unit protection value for use in verifying the validity of the data unit, and wherein re-establishing the data unit protection process for the data-set further comprises:
    creating a recalculated data unit protection value and replacing the stored data unit protection value with the recalculated data unit protection value; and
    removing the data unit protection invalidity indicator from association with the data-set.

7. The method of claim 5, wherein the data unit data-set is stored in a cache memory.

8. The method of claim 5, wherein the data unit data-set is stored on a logical volume.

9. The method of claim 5, wherein the data-set is in transit between components of the computer system.

10. The method of claim 5, wherein the data-set is in transit in a data communications network.

11. The method of claim 5, further comprising:
    identifying the corrupted data-set;
    suspending the data unit protection process for the corrupted data-set.

12. The method of claim 11, wherein the data further comprises meta-data protection for use in verifying the validity of meta-data associated with the data-set, and wherein identifying the corrupted data-set comprises identifying a data-set that has meta-data protection that is suspected of having been corrupted.

13. A computer program product residing on a non-transitory computer readable medium for managing I/O operations for data in a computer system, comprising instructions for causing a computer to:
    receive a request for an I/O operation for a data-set for which a data unit protection process associated therewith has been suspended, the data-set being indicated as a corrupted data-set; and
    re-establish the data unit protection process for the data-set in response to the request and before the I/O operation is conducted.

14. The computer program product of claim 13, further comprising instructions for causing a computer to:
    identify the corrupted data-set; and
    suspend the data-set protection process for the corrupted data-set.

15. The computer program product of claim 14, wherein the data further comprises meta-data protection for use in verifying the validity of meta-data associated with the data-set; and wherein identifying the corrupted data-set comprises identifying a data-set that has meta-data protection that is suspected of having been corrupted.

16. The computer program product of claim 13, wherein a data unit of the data-set has associated therewith a stored data unit protection value for use in verifying the validity of the data unit; and further comprising instructions for causing a computer to:
    create a recalculated data unit protection value and replace the stored data unit protection value with the recalculated data unit protection value; and
    remove the data unit protection invalidity indicator from association with the data-set.

17. The computer program product of claim 13, wherein the data-set has a data unit protection invalidity indicator for indicating that the data-set has data unit protection that is suspected of having been corrupted; and further comprising instructions for causing a computer to suspend the data unit protection process for the data-set in the presence of the data unit protection invalidity indicator.

18. A data storage system comprising:
    a data storage device for storing a data unit;
    meta-data associated with the data unit and having a data unit protection process associated therewith and having a data unit protection invalidity indicator for indicating suspension of the data unit protection process;
    a processor coupled to the data storage device and operable to manage I/O operations for the data unit on the basis of the meta-data associated therewith, the processor further operable to:
        receive a request for an I/O operation for the data unit, wherein the data unit is included in a data-set indicated as a corrupted data-set;
        recognize the presence of the data unit protection invalidity indicator;
        re-establish the data unit protection process for the data unit in response to the request and before the I/O operation is conducted; and remove the data unit protection invalidity indicator from the meta-data.

19. The data storage system of claim 18, wherein the data unit has associated therewith a stored data unit protection value for use in verifying the validity of the data unit; and wherein re-establishing the data unit protection process for the data unit includes creating a recalculated data unit protection value and replacing the stored data unit protection value with the recalculated data unit protection value.

20. The data storage system of claim 18, wherein the data further includes meta-data protection for use in verifying the validity of the meta-data associated; and wherein the processor is further operable to:

identify the corrupted data-set by identifying that the data-set that has meta-data protection that is suspected of having been corrupted.

* * * * *